April 25, 1961  R. H. WHITE  2,981,570
RECIRCULATING ROLLER BEARING
Filed Sept. 23, 1957  2 Sheets-Sheet 1

R. H. WHITE
INVENTOR

BY Mason, Porter, Miller & Stewart

ATTORNEYS

April 25, 1961   R. H. WHITE   2,981,570
RECIRCULATING ROLLER BEARING
Filed Sept. 23, 1957   2 Sheets-Sheet 2
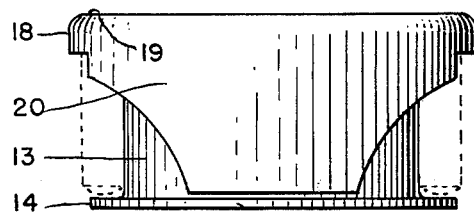
FIG. 4.
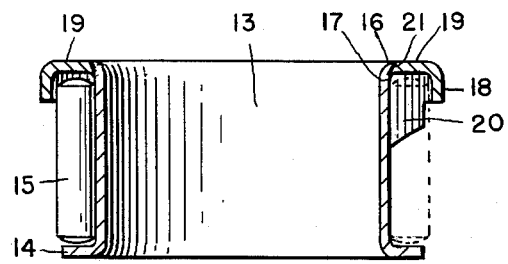
FIG. 5.
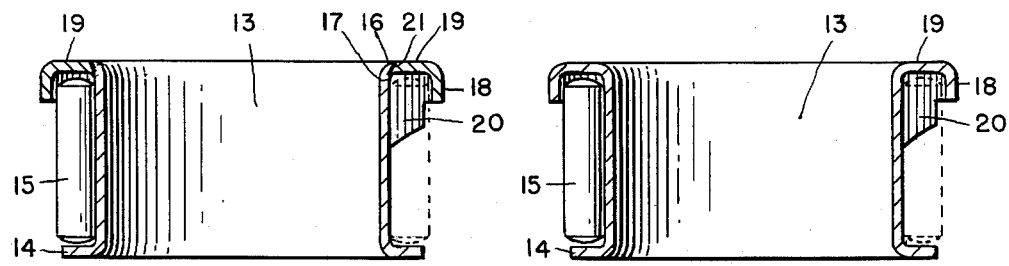
FIG. 6.
FIG. 7.
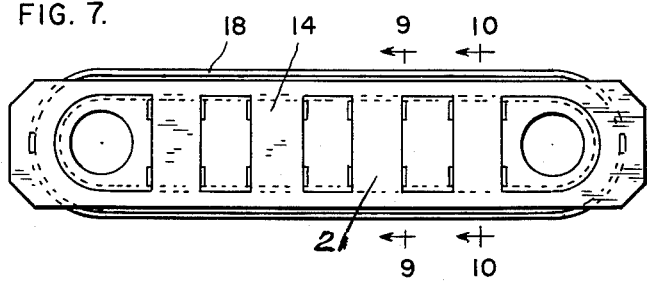
FIG. 8.
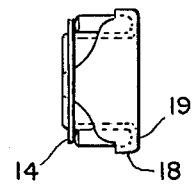
FIG. 9.
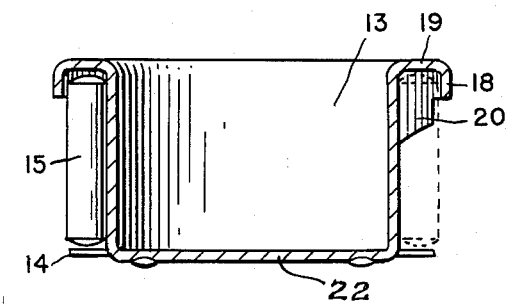
FIG. 10.
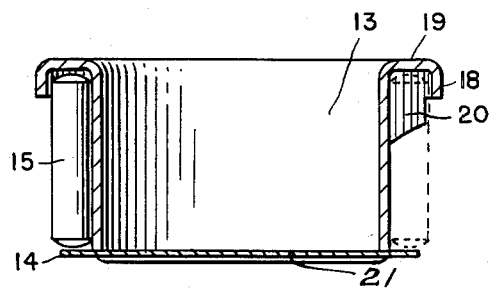
R. H. WHITE
INVENTOR
BY Mason, Porter, Miller & Stewart
ATTORNEYS

# United States Patent Office 2,981,570
Patented Apr. 25, 1961

2,981,570

RECIRCULATING ROLLER BEARING

Robert H. White, Torrington, Conn., assignor to The Torrington Company, Torrington, Conn., a corporation of Maine Filed Sept. 23, 1957, Ser. No. 685,690

2 Claims. (Cl. 308—6)

The invention of which the following is a detailed specification relates to a novel improvement in recirculating roller bearings. These are bearings which will permit reciprocating movement through rollers between two machine parts. Thus the parts may be enabled to move relatively to each other in a longitudinal movement through rolling contact rather than through direct sliding contact of the two members. An application of these is in a drive shaft where the spline is modified to receive two or more of these bearings in which the driven part must necessarily move longitudinally with respect to the driving part.

One of the objects of the invention is to provide a small diameter roller bearing assembly unit to be fitted on or in one part of a machine, and to provide longitudinal antifriction bearing qualities between this part and a second part so that the two parts may reciprocate relatively with the minimum of friction and wear.

An object of the invention is to provide a unit bearing assembly which provides a long longitudinal rolling contact area for load-carrying ability in contradistinction to a cam follower bearing which presents only a line contact with the machine elements.

A still further object of the invention is to provide a bearing assembly which may be installed or replaced as a unit with the minimum of labor.

Among the objects of the invention is to provide a bearing unit which may be installed or replaced as a unit and can be fabricated from readily available material with a minimum of labor and cost.

Other objects of the invention will be apparent from the description of the preferred form of the invention as illustrated by way of example in the following drawings in which:

Fig. 4 is an enlarged end view of the bearing, with rollers shown in phantom;

Fig. 5 is an enlarged vertical transverse section on the line 5—5 of Fig. 3 with rollers shown in phantom on one side;

Fig. 6 is the same view as Fig. 5 of a modified construction;

Fig. 7 is a bottom view of a second modified construction of the recirculating roller bearing;

Fig. 8 is an end view of the bearing construction as shown in Fig. 7;

Fig. 9 is an enlarged vertical transverse section of the bearing on the line 9—9 of Fig. 7 with rollers removed on one side and Fig. 10 is an enlarged vertical transverse section of the bearing on the line 10—10 of Fig. 7 with rollers removed on one side.

Briefly described, the invention consists in providing an elongated inner race with integral transfer channels at each end and roller retaining flanges for a plurality of bearing rollers, suitable for mounting upon a rib or key and thus present the rollers for receiving load from the opposite machine parts. As is customary, the engagement of the reciprocating parts with the rollers occurs on one side of the bearing unit at a time, and the recirculation occurs from the rolling of the individual rollers as they travel through and out of the load area through the transfer channel to the unloaded section and are replaced by other rollers of the complement transferring from unloaded path to loaded path.

Figure 1:
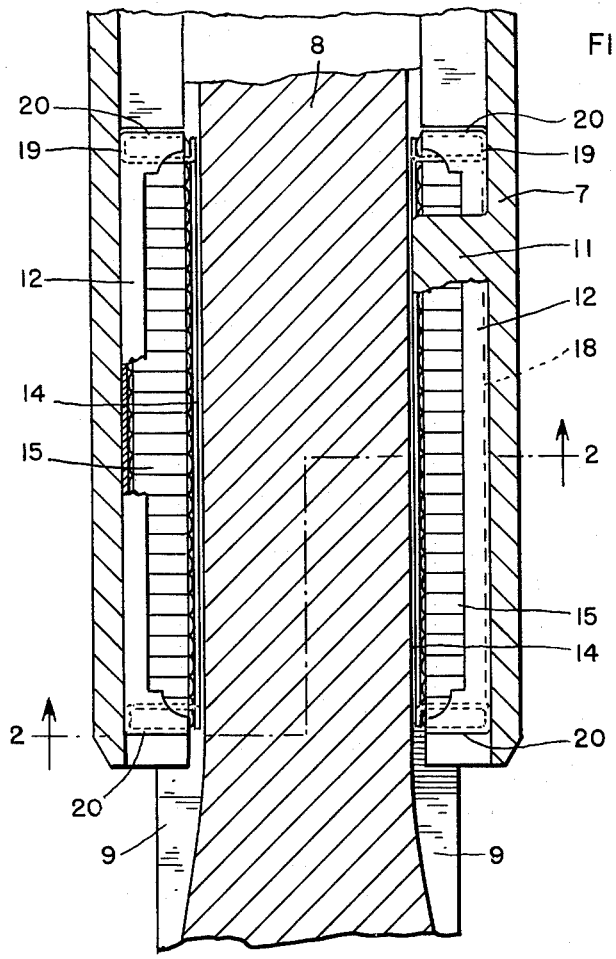
Fig. 1 is a longitudinal section of a telescoping splined coupling bearing equipped with the improved recirculating bearing taken on the line 1—1 of Fig. 2.
Figure 3:
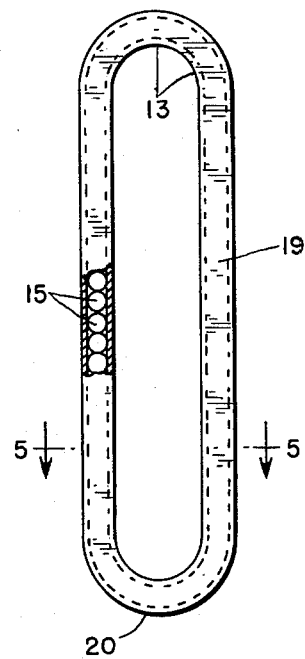
Fig. 3 is a plan view of the recirculating bearing; a portion of upper flange being removed to show roller ends.
Figure 2:
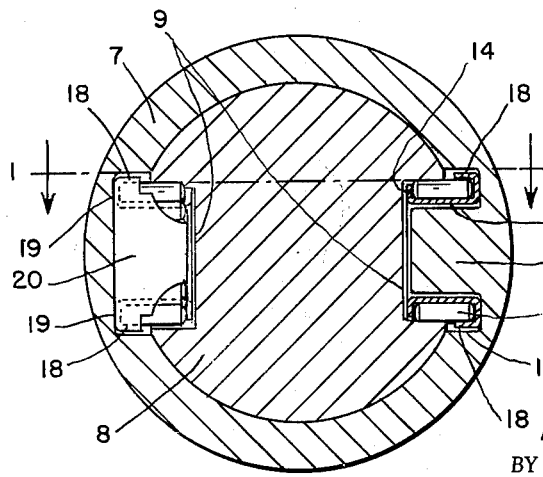
Fig. 2 is a vertical transverse section of the same taken on the line 2—2 of Fig. 1.

For the purpose of example, the bearing is shown in the drawings as applied to a yoke or sleeve 7, Figs. 1 and 2, of a rotary universal joint or the like. In this way torque is carried through a slidable driven shaft or the like. A typical drive shaft 8 is shown. This must be free to reciprocate axially relative to the yoke 7 during the rotation of the unit or joint. The drive shaft 8 has two or more diametric longitudinal grooves or keyways 9. These keyways or grooves have flat bottoms and vertical sides. Diametric longitudinal keys 11 project inwardly from the inner surface of the sleeve or yoke 7. At each side of keys 11 are grooves 10. The keys 11 serve as supports for elongated antifriction recirculating bearings 12, 12. The latter are fitted on the keys 11 and occupy in the sleeve with clearance the space 10 beside the key and around its end and in the shaft with clearance the space provided by keyway 9.

The bearing 12, Figs. 4, 5, 6, 7 and 8, consists of a plurality of rollers 15 spaced along and exterior to a raceway 13. Extending substantially perpendicular from raceway 13 at one face is a flange 14. The flange 14 forms part of the roller-retaining means by confining one end of the roller to limited axial-directed movement.

At the opposite edge of the race 13 and at the other extremity of the roller is an extended channel-shaped flange 19. The ends 20, of the flange 19, shown fully in Figs. 4 and 8 and partially in Figs. 5, 6, 9 and 10, extend to overhang or enclose the rollers for the major length of the rollers for the major portion of the arcs and thus form a closed outside track, guide, or return channel for the individual rollers 15 as they travel around the arcuate ends of the bearing.

The sides 18 of the flange 19 extend to cover at least that portion of the roller length required to retain the rollers between the flange 14 and the side 18. As shown in Fig. 2, the sides 18 are entirely within the grooves 10 so that the rollers are exposed to contact with the sides of the grooves 9 for their full height.

As shown in Fig. 5, flange 14 is integral with the raceway 13. On the opposite face of the raceway sleeve a small step is formed into the material to form a lip 16. The flange 19 is a separate L-shaped plate having a tapering inner edge and is placed on and located by the step. The end of the lip is then formed into the tapering inner edge of the flange 19 so the two are firmly affixed to each other.

A modification of the design is shown in Fig. 6. The flanges and raceway are integral. With this sole exception in construction the design is identical with Fig. 5.

A second modification of the construction is shown in Figs. 7, 8, 9 and 10.

The member 14 is in the form of a plate. This plate has transverse portions 21 leaving alternate open spaces.

The raceway 13 is in the form of a cup having a bottom 22. This bottom is cut away to leave openings which receive the portions 21 of the bottom plate. By staking as indicated in Figs. 7 and 9, the bottom of the cup will hold the bottom plate in place.

Numerous applications of a bearing of this type will` be readily understood. The dimensions of the elongated bearing may also be varied to conform to the load imposed. Changes in proportions and materials will, of course, be possible where desired. While the preferred form of the invention has been described, the scope is to be understood as not limited except by the following claims.

What I claim is:

1. A roller bearing comprising a continuous inner race sleeve with two parallel straight-sided portions and connecting arcuate end portions, a flange extending outwardly from one edge of the sleeve, a plurality of rollers confined by said flange outside of the sleeve, a second flange extending outwardly from the opposite edge of the sleeve, said second flange having depending straight portions enclosing the adjacent ends of the rollers and having depending arcuate walls completely enclosing the said rollers opposite the arcuate end portions of the sleeve.

2. A roller bearing comprising an inner race formed as a cup with a bottom, opposite parallel side walls and connecting arcuate end walls, both said walls having a coextensive laterally extending outer flange, the edge portion of said flange being bent down parallel to the sidewalls, a plurality of rollers enclosed by said edge portion, the bottom of said cup having parallel slots, a plate with parallel bars fitting within said slots and having an edge portion confining the adjacent ends of the rollers and staking means for holding the plate and bottom together.

References Cited in the file of this patent

UNITED STATES PATENTS

| | | |
|---|---|---|
| 2,063,787 | Brown | Dec. 8, 1936 |
| 2,402,546 | Gaykowski | June 25, 1946 |
| 2,721,775 | Nusbaum | Oct. 25, 1955 |

FOREIGN PATENTS

| | | |
|---|---|---|
| 1,125,204 | France | July 9, 1956 |